(12) United States Patent
Bleumer et al.

(10) Patent No.: US 7,694,010 B2
(45) Date of Patent: Apr. 6, 2010

(54) METHOD FOR EXCHANGING DATA BETWEEN DATA PROCESSING UNITS

(75) Inventors: Gerrit Bleumer, Schildow (DE); Clemens Heinrich, Berlin (DE)

(73) Assignee: Francotyp-Postalia AG & Co. KG (DE)

( * ) Notice: Subject to any disclaimer, the term of this patent is extended or adjusted under 35 U.S.C. 154(b) by 1161 days.

(21) Appl. No.: 10/794,193

(22) Filed: Mar. 5, 2004

(65) Prior Publication Data

US 2004/0230622 A1    Nov. 18, 2004

(30) Foreign Application Priority Data

Mar. 5, 2003   (DE) ................... 103 09 815

(51) Int. Cl.
*G06F 15/16* (2006.01)
*G06F 17/00* (2006.01)
*G07B 17/02* (2006.01)

(52) U.S. Cl. .................. 709/237; 705/401; 705/404

(58) Field of Classification Search ......... 707/200–204; 709/237; 705/401, 404
See application file for complete search history.

(56) References Cited

U.S. PATENT DOCUMENTS

| | | | |
|---|---|---|---|
| 5,699,415 A | 12/1997 | Wagner | |
| 5,960,416 A * | 9/1999 | Block | 705/34 |
| 6,081,795 A * | 6/2000 | Ryan, Jr. | 705/408 |
| 6,694,336 B1 * | 2/2004 | Multer et al. | 707/201 |
| 6,922,792 B2 * | 7/2005 | Moser et al. | 714/4 |
| 7,028,891 B2 * | 4/2006 | O'Neal | 235/380 |
| 7,085,725 B1 * | 8/2006 | Leon | 705/1 |
| 7,093,761 B2 * | 8/2006 | Smith et al. | 235/462.07 |
| 7,120,610 B1 * | 10/2006 | Brookner et al. | 705/401 |
| 7,152,049 B2 * | 12/2006 | Ryan, Jr. | 705/401 |

FOREIGN PATENT DOCUMENTS

EP      0 709 778      7/1995

OTHER PUBLICATIONS

"Transaction Processing: Concepts and Techniques," Gray et al (1993), pp. 3-43 and 529-577.
"Data Base Systems," Rob et al (1995) pp. 353-377.

* cited by examiner

*Primary Examiner*—Paul H Kang
*Assistant Examiner*—Shirley X Zhang
(74) *Attorney, Agent, or Firm*—Schiff Hardin LLP

(57) ABSTRACT

In a method and arrangement for exchanging data between a first processing unit, containing first status information about the first data processing unit, and a second data processing unit, containing second status information about the first data processing unit, data are exchanged between the first and second units during transactions that include a status-changing transaction, which can be of two different types. Upon a successful completion of the status-changing transaction, the first and second status information are revised so that they match. Upon an unsuccessful completion of the status-changing transaction, at least one of the first and second status information is set dependent on the type of the status-changing transaction.

18 Claims, 5 Drawing Sheets

METHOD FOR EXCHANGING DATA BETWEEN DATA PROCESSING UNITS

BACKGROUND OF THE INVENTION

1. Field of the Invention

The present invention pertains to a method for exchanging data between a first data processing unit containing first status information about the first data processing unit and a second data processing unit containing second status information about the first data processing unit. Data are exchanged between the first data processing unit and the second data processing unit during the course of transactions. The transactions include status-changing transactions, at the successful completion of which the first status information and the second status information are revised such that they match. At least two different types of status-changing transactions are carried out. The present invention also pertains to a corresponding arrangement for implementing this method.

2. Description of the Prior Art

Constellations of this type with a first data processing unit containing first status information about its status and a second data processing unit containing second status information about the status of the first data processing unit are frequently encountered in certain networks that are composed of such data processing units. In some known networks, for example, a series of first data processing units performs certain services or offers certain functions independently of a central second data processing unit. It is occasionally necessary, however, for the first data processing unit to communicate with the central second data processing unit. During the course of this communication, the utilization of the first data processing unit is acquired in the central second data processing unit by comparing the first and the second status information.

Another part of such communications frequently is in the form of transactions that change the status, in particular, the first status information of the first data processing unit.

Often the first data processing unit is locked for further use after a certain time of utilization or after a certain intensity of utilization that is indicated by the first status information. In order to cancel or prevent the locking of the first data processing unit, a status-changing transaction is carried out in which the first status information is revised in such a way that the first data processing unit can once again be used for an extended period of time or to a greater extent. In other words, a status-changing type of transaction is carried out in this case in order to broaden the privileges of the first data processing unit.

Transactions of a different type are also carried out quite frequently, wherein the privileges of the first data processing unit are restricted by these transactions. It is possible, in particular, to lock the first data processing unit for further use with such a transaction because it was detected that the data processing unit was somehow manipulated or the user of the first data processing unit is delinquent in paying the fee for utilizing the first data processing unit. One example of first data processing units in a constellation of this type are the accounting units of postage metering machines, in which the available credit balance is stored. In order to ensure the uninterrupted metering of postage, it is necessary to periodically load funds so as to refill the credit balance via a remote data center that functions as the second data processing unit, namely with a first type of transaction. If an excessively high amount of credit was loaded or the loaded amount should be reduced for other reasons, postage metering machines of this type frequently allow for lowering the credit balance with a second type of transaction.

The data center maintains records on the status of each registered postage metering machine, namely for the time at which the data center and the respective postage metering machine were last in contact. These records on the status of the postage metering machine, i.e., the second status information on the first data processing unit, are maintained in the data center so as to prevent fraud attempts in the form of manipulations of the first status information, e.g., the deposited credit balance, from remaining undetected.

During each status-changing transaction that is not successfully completed, for example, due to a premature interruption of the communication link, it remains unclear whether the first status information and the second status information were revised such that they match.

In the case of such an unsuccessful status-changing transaction, the user of the postage metering machine usually needs to repeat the corresponding procedure as many times as required for successfully completing the transaction. For the user of the postage metering machine, this is a bothersome and usually time-consuming process.

In this context, it is disclosed in U.S. Pat. No. 5,699,415 to carry out a check between the postage metering machine and the data center during the course of an ensuing transaction, wherein the check provides information as to whether the prior transaction was successfully completed. If the check indicates that the prior transaction was not successfully completed, it is suggested to repeat, cancel or patch this transaction. However, the problem encountered in this case is that an incorrect status of the postage metering machine is registered in the data center for the duration between the unsuccessfully completed transaction and the ensuing transaction.

If a deposit transaction is terminated, for example, after the second status information is revised in the data center but before the first status information is correspondingly revised in the postage metering machine, an excessively high credit balance—i.e., a debit for the user of the postage metering machine—is incorrectly registered in the data center. With regard to security aspects, this may be acceptable for the operator of the data center. If a transaction is interrupted in which the credit balance is lowered due to a return of funds, however, an excessively low credit balance in the postage metering machine, i.e., a credit for the user, is incorrectly registered in the data center. With regard to security aspects, this is undesirable for the operator of the data center because funds may be erroneously refunded, if applicable, to the user of the postage metering machine before the error is detected.

With respect to the handling of credit balances of postage metering machines, the security aspects of the operator of the data center predominate. The satisfaction of the user is of primary importance in other transactions, for example, the clearance of the postage metering machine for initial use. In this case, it would be undesirable if the postage metering machine were actually cleared for use but remained registered as being locked in the data center such that the metering processes carried out with this postage metering machine will be categorized as invalid when using the status data registered at the data center.

SUMMARY OF THE INVENTION

An object of the present invention is to provide a method as well as an arrangement of the initially cited type with which it is possible to entirely or at least partially eliminate the aforementioned disadvantages and with which, in particular, the safe and reliable handling of unsuccessfully completed transactions under predetermined criteria is ensured.

The above object is achieved in accordance with the invention by a method and an apparatus of the type initially described wherein, upon the unsuccessful completion of a status-changing first transaction, at least the first status information or at least the second status information is set dependent on the type of the first transaction.

Since the first or second status information is set dependent on the type of the unsuccessfully completed transaction, the criterion associated with the respective transaction can be easily and optimally taken into account. The criterion defining the procedures after the unsuccessfully completed transaction can be arbitrarily predetermined for each individual transaction or group of transactions. Of course the first or second status information does not necessarily have to be revised. It would also be conceivable to realize constellations in which they are set or remain unchanged.

For example, the first status information as well as the second status information can be set dependent on the unsuccessfully completed transaction based upon the data processing unit, in which the unsuccessful completion of the transaction was detected. The question in which of the two data processing units the status information needs to be set dependent on the type of transaction in any case may also depend on the decisive criterion for the respective transaction.

In constellations in which a security aspect of the second data processing unit predominates, the second status information can be set in accordance with the type of transaction in any case. This applies, for example, to the handling of postage in constellations having first data processing units in the form of postage metering machines and a second data processing unit in the form of a remote data center. When loading postage into the postage metering machine and when withdrawing postage from the postage metering machine during the course of an unsuccessfully completed transaction, it needs to be ensured that the second status information on the respective postage metering machine is treated in accordance with a predetermined criterion in the data center.

For example, a progressive strategy may be pursued when depositing funds into the postage account, i.e., if the corresponding transaction is prematurely interrupted, it can always be assumed in the data center that the postage was actually deposited into the postage metering machine. In this case, the second status information is revised as if the transaction was successfully completed. Corresponding measures can be taken if it is determined that this is not the case during an ensuing transaction.

When withdrawing funds from the postage account, it is possible to pursue a defensive strategy, i.e., if the corresponding transaction is prematurely interrupted, it can always be assumed in the data center that the postage was not withdrawn from the postage metering machine. In this case, the second status information is set in an unchanged fashion, i.e., as if the transaction did not take place. Corresponding measures can be taken if it is determined that this is not the case during an ensuing transaction.

In another possible constellation, the first data processing unit plays a decisive role and it needs to be ensured that the first status information is set in accordance with the type of unsuccessfully completed transaction in any case. This may, in particular, be the case if the first data processing unit ensures the reliable storage of the first status information while the reliable storage of the second status information in the second data processing unit can, if at all, not be ensured to the same degree. For example, this applies to postage metering machines that are equipped with a first data processing unit in the form of a corresponding security module and a remote data center that is not equipped with a secure second data processing unit.

The method according to the invention can be used in connection with arbitrary transaction sequences. It is possible, in particular, to determine in an arbitrary fashion whether a transaction was successfully completed. In simple, and thus preferred, versions of the method according to the invention, the first status information is revised during the first transaction, with the revision being triggered by a revision message of the second data processing unit which is received by the first data processing unit. The second status information is also revised, with this revision being triggered by a confirmation message of the first data processing unit which is received by the second data processing unit. The confirmation message confirms the revision of the first status information. If the first transaction is not successfully completed due to the failure of a flawless confirmation message to appear, the second status information is set in dependence on the type of said first transaction.

The measures described above should be taken if it is determined during an ensuing transaction that the revision of the respective status information in accordance with an unsuccessfully completed transaction was incorrect. This usually requires corresponding records of prior transactions. These records may be realized arbitrarily. For example, a corresponding record can be generated for each transaction.

In a further embodiment of the method according to the invention, the computational expenditure is minimized due to the fact that a corresponding record is only generated in case of an unsuccessfully completed transaction.

If the first transaction is not successfully completed, first transaction status information is preferably generated and stored in either the data processing unit or the second data processing unit depending on the predominance, wherein the first transaction status information is also dependent on the type of the first transaction. The first transaction status information may be composed of arbitrary data. In the simplest case, a predetermined memory is set to a corresponding value. In other words, a so-called "flag" is set which is representative of the type of unsuccessfully completed transaction.

In other respects, at least the first status information or at least the second status information may be set dependent on the first transaction status information.

If the first data processing units are, in particular, postage metering machines, the second data processing unit in the form of a remote data center frequently plays a particularly important role. In certain embodiments of the method according to the invention, the first transaction status information is stored in the first data processing unit and at least the second status information is set dependent on the first transaction status information.

As mentioned above, in a preferred embodiment of the method according to the invention at least one defensive recovery strategy and one progressive recovery strategy are implemented to reestablish the conformity between the first status information and the second status information after the unsuccessful completion of a first transaction. The recovery strategy is chosen dependent on the type of first transaction.

If the reestablishment of the conformity is initiated by the first data processing unit, the first status information is set in an unchanged fashion if the defensive recovery strategy is employed. In the progressive recovery strategy, in contrast, the first status information is set as if the first transaction was successfully completed.

If the reestablishment of the conformity is initiated by the second data processing unit, the second status information is set in an unchanged fashion if the defensive recovery strategy is employed. In the progressive recovery strategy, the second status information is set as if the first transaction was successfully completed.

In instances in which the status information is incorrectly revised dependent on the unsuccessfully completed transaction, a subsequent correction should be carried out as described above. This correction can be realized in any arbitrary fashion. For example, a separate correction routine could be provided which mandatorily reestablishes the communication between the data processing units in order to provide for a correction after such an unsuccessfully completed transaction, preferably in an automated fashion.

In a simple and thus preferred embodiment of the method according to the invention, the first status information and the second status information are compared during the course of a second transaction that follows the first transaction. If the first status information and the second status information do not match, they are synchronized in order to reestablish their conformity. In this case, the synchronization of the first status information and the second status information takes place in dependence on the type of first transaction.

In principle, any suitable method may be employed in order to ensure that the synchronization takes place dependent on the type of first transaction. In this context, the above-described first transaction status information preferably is utilized. For this purpose, first transaction status information that depends on the type of said first transaction is generated and stored if said first transaction is not successfully completed. The synchronization of the first status information and the second status information then takes place dependent on the first transaction status information during the ensuing transaction.

As mentioned above a second data processing unit in the form of a remote data center frequently plays an important role, in particular, if the first data processing units consist of postage metering machines. In an embodiment of the method according to the invention, the first transaction status information is stored in the second data processing unit. The synchronization of the first status information and the second status information is initiated by the second data processing unit in this case.

In order to achieve an effective and reliable synchronization if the first and the second status information do not match, in a preferred embodiment of the method according to the invention at least one defensive recovery strategy and one progressive recovery strategy are implemented when a transaction is not successfully completed. The recovery strategy is again chosen dependent on the type of first transaction.

If the synchronization is initiated by the first data processing unit, the first status information is set such that it matches the second status information when employing the defensive recovery strategy. In the progressive recovery strategy, the second status information, in contrast, is set such that it matches the first status information.

In an alternative embodiment, the second status information is set such that it matches the first status information if the synchronization is initiated by the second data processing unit and the defensive recovery strategy is employed. When employing the progressive recovery strategy, the first status information is set such that it matches the second status information.

The first transaction status information preferably is also utilized in this case. If a first transaction is unsuccessfully completed, first transaction status information that depends on the type of first transaction is generated and stored, and the recovery strategy is selected in dependence on the first transaction status information.

In this respect, the synchronization is also initiated by the second data processing unit in certain variations of the method according to the invention. This is the reason why the first transaction status information is stored in the second data processing unit.

In a preferred embodiment of the method, in order to facilitate an integrity check of the second order, a status model that covers at least all possible changes of the state of the first data processing unit and consequently all revisions of the first status information. The status model preferably also covers all conditions for the change from one state into an ensuing state.

In this case, an integrity check is carried out during the synchronization of the first and the second status information. During this integrity check, it is determined based on the status model whether an adaptation between the first status information contained in the first data processing unit and the second status information contained in the second data processing unit is even possible—in one or more steps—or an insurmountable conflict has occurred. The synchronization continues if it is determined that an adaptation between the first status information and the second status information is possible. The synchronization is interrupted in all other instances, i.e., if it is determined that an adaptation between the first status information and the second status information is not possible.

The method according to the invention can be utilized with arbitrary constellations, in which transactions that change the state of the first data processing unit are carried out during the course of the communication between two data processing units. These transactions may be, for example, transactions that change the values of certain registers of the first data processing unit. They may also be transactions that cause a change between individual operating states of the first data processing unit. These operating states may be, for example, the following states: a state of initialization in which the first data processing unit is configured for its normal operation, a clearance state in which the first data processing unit can be operated normally, a locked state in which the first data processing unit is reversibly locked for normal use, as well as a state of termination in which the first data processing unit is irreversibly locked for further use.

As mentioned above, the invention can be utilized in a particularly advantageous fashion in constellations in which several first data processing units communicate with at least one central second data processing unit. The utilization of the invention is particularly advantageous in connection with postage metering machines. Consequently, the first data processing unit consists of the security module of a postage metering machine.

When handling security-relevant data, in particular, the communication between the first data processing unit and the second data processing unit preferably takes place via a secure connection. In this case, a secure communication channel preferably is initially established between the two communication partners and used for further communications by both partners. It is also preferred to utilize hitherto known methods and protocols with a significant mutual authentication of the communication partners, for example, the so-called Secure Socket Layer Protocol (SSL 3.0) or the so-called Transport Layer Security Protocol (TLS 1.0).

Naturally, other methods also may be employed as long as a sufficiently secure communication is ensured. The degree of communication security typically depends on the importance of the data to be secured. If the data only has a comparatively low security relevance, a weaker security system may suffice by all means. High-security systems are provided for communicating data that is relevant to billing purposes, for example, the amounts of postage deposited into postage metering machines.

The present invention also pertains to an arrangement having a first data processing unit and a second data processing unit that can be connected to the first data processing unit via a communication link. The first data processing unit has a number of operating states and has a first memory for storing first status information that defines the respective operating state of the first data processing unit. The second data processing unit contains a second memory for storing second status information that is also representative of the operating state of the first data processing unit. The first data processing unit and the second data processing unit are designed for carrying out transactions, in which data are exchanged between the first data processing unit and the second data processing unit. The transactions include status-changing transactions. The first data processing unit and the second data processing unit are realized in such a way that said first status information and the second status information are revised such that they match if a status-changing transaction is successfully completed. The first data processing unit and the second data processing unit also are designed for carrying out at least two different types of status-changing transactions. According to the invention, at least the first data processing unit is designed for setting the first status information dependent on the type of the first transaction if a status-changing first transaction is not successfully completed. Alternatively, at least the second data processing unit may be designed for setting the second status information dependent on the type of the first transaction if a status-changing first transaction is not successfully completed.

The same advantages as those described above with respect to the method according to the invention can be realized with an arrangement of this type. Such an arrangement is particularly suitable for implementing the method according to the invention.

The first data processing unit preferably is designed for revising the first status information, with this revision being triggered by a revision message received during the course of the first transaction. The second data processing unit then preferably is designed such that it revises the second status information, with this revision being triggered by a subsequently received confirmation message. The second data processing unit is also designed to set the second status information dependent on the type of the first transaction if it is determined that the first transaction was not successfully completed due to the failure of a flawless confirmation message to appear. For this purpose, a corresponding transaction memory may be provided, for example, in the second data processing unit. This transaction memory is addressed in accordance with the type of transaction being carried out if a flawless confirmation message fails to appear, and a corresponding command sequence for treating the second status information is stored for each type of transaction in the transaction memory. This transaction memory preferably is freely modifiable such that arbitrary criteria for the treatment of unsuccessfully completed transactions can be defined.

In order to implement the above-described transaction status information, the first data processing unit preferably is designed for generating and storing first transaction status information if the first transaction is not successfully completed. This is the case, for example, if subsequent synchronizations are initiated by the first data processing unit. Alternatively, the second data processing unit may also be designed for generating and storing first transaction status information if the first transaction is not successfully completed. The first transaction status information depends on the type of the first transaction in both instances.

In a preferred embodiment of the arrangement according to the invention, the first data processing unit has at least two different modes in order to reestablish the conformity between the first status information and the second status information after the unsuccessful completion of a first transaction. These operating modes are a defensive recovery mode and a progressive recovery mode. In addition, the first data processing unit is designed for selecting the recovery mode dependent on the type of the first transaction. If the first data processing unit is in the defensive recovery mode, it sets the first status information in an unchanged fashion if the first transaction is not successfully completed. If the first data processing unit is in said progressive recovery mode and the first transaction is not successfully completed, it sets the first status information as if the first transaction was successfully completed.

In another embodiment of the arrangement according to the invention, the second data processing unit is designed for subsequently reestablishing the conformity accordingly. The second data processing unit may also have a defensive recovery mode and a progressive recovery mode, and this data processing unit is switched into the recovery mode dependent n the type of the first transaction.

In a preferred embodiment of the arrangement, in order to facilitate the above-described synchronization of the first and the second status information during the course of an ensuing second transaction, the said first data processing unit and, additionally or alternatively, the second data processing unit is/are designed for comparing the first status information and the second status information during the course of the second transaction. If it is determined that the first and the second status information do not match, a synchronization of the first status information and the second status information is carried out by the respective processing unit dependent on the type of the first transaction.

The first data processing unit and, additionally or alternatively, the second data processing unit preferably is/are designed for employing the above-described transaction status information. This transaction status information is generated by the respective data processing unit dependent on the type of the first transaction and is stored. Subsequently, the synchronization of the status information is carried out dependent on the first transaction status information. For this purpose, the respective data processing unit accesses the memory with the memory value that was previously set dependent on the type of said first transaction at the beginning of the synchronization and then proceeds dependent on the acquired memory value during the synchronization.

As described above, the second data processing unit preferably has at least one defensive recovery mode and one progressive recovery mode. The second data processing unit preferably is designed for selecting the recovery mode dependent on the type of the first transaction and for initiating the synchronization. In this case, the first data processing unit and the second data processing unit are designed for setting the second status information such that it matches the first status information in the defensive recovery mode. In said progressive recovery mode, the first status information is set such that it matches the second status information.

In this case, the second data processing unit preferably also is designed for generating and storing first transaction status information that depends on the type of the first transaction if the first transaction is not successfully completed, as well as for selecting the recovery mode in dependence on the first transaction status information.

Naturally, the synchronization of the status information may also be initiated by the first data processing unit in other variations of the arrangement according to the invention, wherein the first data processing unit is designed accordingly in such instances.

The above-described integrity check is utilized in a preferred embodiment of the arrangement according to the invention. For this purpose, a status model is stored in the first data processing unit and, additionally or alternatively, in the second data processing unit. This status model contains all possible revisions of the status information on the first data processing unit. The respective data processing unit is designed for carrying out an integrity check during the synchronization in such instances, namely in such a way that it is checked based on the status model whether an adaptation between said first status information and said second status information is possible. If this is the case, the respective data processing unit continues with the synchronization. If this is not the case, the data processing unit terminates the synchronization.

The two data processing units may be designed in any suitable fashion. In simple and thus preferred variations, the first data processing unit has a first processor that is connected to a first memory, as well as a first communication device that is connected to the first processor and serves for exchanging data with the second data processing unit. The second data processing unit has a second processor that is connected to a second memory, as well as a second communication device that is connected to said second processor and serves for exchanging data with the first data processing unit.

Of course the respective communication devices do not necessarily have to be integrated into the respective data processing units. For example, at least one of the communication devices may be an external communication unit that is connected to the data processing unit in question and serves for transmitting data to the other data processing unit.

Any other known transmission methods and protocols may be considered individually or in combination for transmitting data between the first data processing unit and the second data processing unit.

The present invention also pertains to a data processing unit with the characteristics of the above-described first data processing unit. In addition, the invention pertains to a data processing unit with the characteristics of the above-described second data processing unit.

DESCRIPTION OF THE PREFERRED EMBODIMENTS

Figure 1:
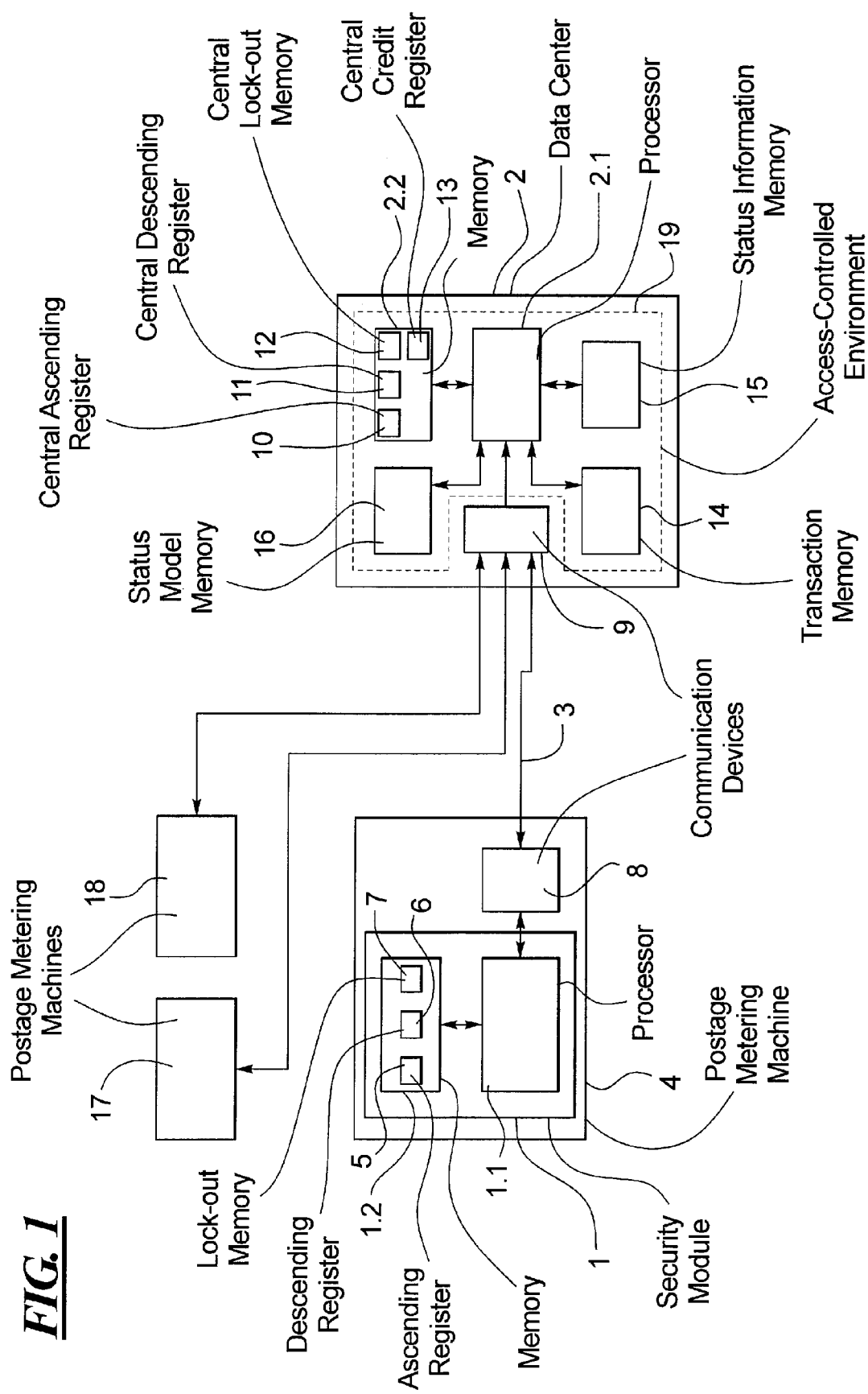
FIG. 1 is a schematic block diagram of a preferred embodiment of the arrangement according to the invention for implementing the method according to the invention.

FIG. 1 is a schematic block diagram of a preferred embodiment of the arrangement according to the invention for implementing the method according to the invention. The arrangement includes a first data processing unit and a second data processing unit that are able to communicate via a communication link 3. The first data processing unit is formed by the security module 1 of a postage metering machine 4, and the second data processing unit is situated in a remote data center 2 that is operated by the manufacturer of the postage metering machine 4.

The security module 1 has a first processor 1.1 and a first memory 1.2 that is connected to the processor. The security module 1 has different operating states, with first status information that characterizes the respective operating state of the security module 1 being stored in the first memory 1.2. This first status information includes, among other things, the register status of an ascending register 5 and a descending register 6, as well as the contents of a lock-out memory 7. The ascending register 5 reflects the sum of all postage amounts deposited into the postage metering machine 4 and withdrawn from the postage metering machine 4. The descending register 6 reflects the up-to-date credit balance available for postage metering processes. The contents of the lock-out memory 7 reflect whether the postage metering machine is cleared for carrying out postage metering processes or locked.

The first processor 1.1 controls the operation of the security module 1 by accessing the first memory 1.2. The security module 1, in turn, influences the operation of the postage metering machine 4 via a connection with a central processor (not-shown) of the postage metering machine 4. The first processor 1.1 is connected to a first communication device 8 of the postage metering machine 4 via an interface (not-shown). This first communication device 8 enables the security module 1 to establish a connection with a second communication device 9 of the data center 2.

The second communication device 9 is connected to a second processor 2.1 of the data center 2 which controls the operation of the data center 2. The second processor 2.1 is connected to a second memory 2.2 containing second status information that characterizes the instantaneous operating state of the security module 1.

This second status information includes the register status of an ascending central register 10 and a descending central register 11, as well as the contents of a central lock-out memory 12. The ascending central register 10 reflects the most recent status of the ascending register 5 available in the data center 2. The descending central register 11 reflects the most recent status of the descending register 6 available in the data center 2. The contents of the central lock-out memory 12 reflect the most recent status of the lock-out memory 8 available in the data center 2.

In addition to the second status information, the second memory 2.2 also contains a central credit register 13 with the up-to-date credit balance available for postage metering processes with the postage metering machine 4.

Transactions can be carried out between the security module 1 and the data center 2 via the communication link 3, with data being exchanged between the security module 1 and the data center 2 during the course of these transactions. These transactions include, among other things, status-changing transactions, upon the successful completion of which the respective operating state of the security module 1 is changed and the first status information is revised accordingly in the first memory 1.2. In this case, different types of status-changing transactions can be carried out.

In a first type of status-changing transaction, for example, postage amounts are loaded into the security module 1 from the data center 2, and the status of the ascending register 5 as well as the status of the descending register 6 is increased by the loaded amount. In a second type of status-changing transaction, postage amounts are returned from the security module 1 to the data center 2, and the status of the ascending register 5 as well as the status of the descending register 6 is reduced by the amount withdrawn.

In a third the type of status-changing transaction, the security module 1 and consequently the postage metering machine 4 are locked for further use by the data center 2, and the lock-out memory 8 is set accordingly. In a fourth type of status-changing transaction, the security module 1 and consequently the postage metering machine 4 are cleared for use by the data center 2, and the lock-out memory 8 is also set accordingly in this case.

Of course different types of status-changing transactions can be carried out, if applicable, during the course of a single transaction. For example, the security module 1 can be cleared for use and postage amounts can be loaded into the security module 1 during a single transaction.

Once such a status-changing transaction is successfully completed, the first status information in the security module 1 is revised, and the second status information is also correspondingly revised, if applicable, in the data center 2 such that the first and the second status information match. In other words, the first and the second status information are synchronized with one another upon the successful completion of such a status-changing transaction.

In the described embodiment, such a synchronization of the first and the second status information takes place during any transaction between the security module 1 and the data center 2. Naturally the synchronization may also be limited to certain types of transactions, particularly status-changing transactions, in other variations of the method according to the invention and the arrangement according to the invention.

If a first status-changing transaction was not successfully completed, for example, due to a communication error between the security module 1 and the data center 2 during the first transaction, it remains unclear whether the first status information was already revised in the security module 1. According to the invention, such an unsuccessfully completed first transaction is treated in the data center 2 dependent on the type of the first transaction.

In this case, the treatment depends on predetermined criteria. In the described example, the security requirements of the operator of the data center are the predominant and decisive criterion for the treatment of transactions pertaining to the transfer of postage amounts. When clearing the security module 1 for use, in particular, the satisfaction of the user of the postage metering machine 4 is used as the decisive criterion.

In order to treat an unsuccessfully completed first transaction in accordance with the decisive criterion for the respective transaction, the data center has a transaction memory 14 that is accessed by the second processor 2.1 if a first transaction is not successfully completed. Specific values for each type of transaction are stored in this transaction memory 14. The second status information is then set in the second memory 2.2 dependent on the specific values for the respective type of unsuccessfully completed first transaction.

Since it remains unclear whether the first and the second status information match if the first transaction has not successfully completed, the unsuccessfully completed first transaction is treated by the data center 2 in such a way that the data center 2 subsequently initiates a routine for reestablishing this conformity between the first and the second status information.

Depending on the type of transaction, different recovery strategies are pursued when the second status information is set in different operating modes of the data center 2.

The data center 2 has a progressive recovery mode for pursuing a progressive recovery strategy. In this case, the second status information is set as if the first transaction was successfully completed. In other words, the second status information in the data center 2 never trails behind the first status information in the security module 1.

The data center 2 also has a defensive recovery mode for pursuing a defensive recovery strategy. In this case, the second status information remains unchanged. In other words, the second status information in the data center 2 never runs ahead of the first status information in the security module 1.

The second processor 2.1 selects the recovery mode dependent on the type of transaction. The aforementioned processor accesses the transaction memory 14 for this purpose.

If a first transaction has not successfully completed, the second processor 2.1 reads out the specific values for the respective type of transaction which are stored in the transaction memory 14. The acquired specific values are then used by the second processor 2.1 for generating first transaction status information that is stored in a transaction status information memory 15 connected to the second processor 2.1. The first transaction status information contains, among other things, a reference to the recovery mode specified for the respective type of said first transaction, i.e., a reference to the recovery strategy to be pursued.

In certain variations of the arrangement according to the invention, it would also be conceivable to set the second status information in the second memory 2.2 after the first transaction status information was generated. It is also possible to set the second status information dependent on the accessed first transaction status information.

The first and the second status information are synchronized during the course of an ensuing second transaction. During this ensuing second transaction, the first status information is transmitted to the data center 2 and compared with the second status information, wherein the first and the second status information are synchronized if they do not match.

The synchronization is carried out dependent on the type of the first transaction. If an inconsistency is detected, the second processor 2.1 accesses the transaction status information memory 15 that contains the first transaction status information on prior unsuccessfully completed first transactions which was generated in accordance with the type of transaction. This synchronization is carried out dependent on the first transaction status information that contains, as described above, a reference to the specified recovery mode. This means that the synchronization is carried out dependent on the type of the first transaction.

If the first transaction status information on the first transaction specifies a progressive recovery mode or a progressive recovery strategy the first status information is set in the security module 1 during the synchronization in such a way that it matches the second status information in the data center 2, namely in response to a corresponding message from the data center 2.

If the first transaction status information on the first transaction specifies a defensive recovery mode or a defensive recovery strategy the second status information is set in the data center 2 during the synchronization in such a way that it matches the first status information in the security module 1.

If one or more transactions are unsuccessfully completed after the first transaction, the first transaction status information naturally contains information about each of these unsuccessfully completed transactions. This means that all consecutive unsuccessfully completed transactions can be taken into account when reestablishing the conformity between the first and the second status information.

In addition, an integrity check is carried out in the data center 2 during the course of the synchronization. For this purpose, a status model for the security module 1 is stored in a status model memory 16, the status model covering all possible changes of the status of the security module 1 and revisions of the first status information, as well as all conditions for the change from one state into an ensuing state.

During the integrity check, the second processor 2.1 checks whether an adaptation between the first status information contained in security module 1 and the second status information contained in the data center 2 is even possible—in one or more steps—or whether an insurmountable conflict has occurred, namely by accessing the status model stored in the status model memory 16. If it is determined that an adaptation between the first status information and the second status information is possible, the synchronization is continued in the above-described fashion. In all other instances, i.e., if it is determined that an adaptation between the first status information and the second status information is not possible, the synchronization is interrupted by the second processor 2.1.

The second transaction may be continued in case an insurmountable conflict occurs, wherein the data center 2 converts the second transaction into a transaction that causes the security module 1, and consequently the postage metering machine 4, to be locked for further use independently of the type of second transaction.

In addition to the postage metering machine 4, additional postage metering machines 17 and 18 may also be connected to the data center 2. The transactions between the data center 2 and these additional postage metering machines 17 and 18, as well as the treatment of unsuccessfully completed transactions, are carried out in the same fashion as described above. At least one separate second memory, one separate transaction status information memory and one separate status model memory is provided for each postage metering machine. Of course these separate memories do not necessarily have to be realized in the form of separate storage modules. They may also be realized in the form of correspondingly defined storage areas of a single storage module with corresponding dimensions.

In order to ensure the integrity of the data in the data center, at least the second processor 2.1 and the second memory 2.2 are arranged in a correspondingly secure and access-controlled environment 19. Such a secure environment 19 can be achieved physically with a secure housing and logically (electronically) with a secure communication link. In the example shown, the transaction memory 14, the transaction status information memory 15 and the status model memory 16 are also arranged in the secure environment 19. The secure environment 19 may be, for example, a single secure hardware module that contains all of the aforementioned components.

If the data center lacks such means for ensuring that the data, particularly the second status information, cannot be manipulated, the synchronization and the selection of the recovery strategy are not initiated in the above-described fashion by the data center in other versions of the invention, but instead are conducted in a decentralized manner by the security module of the respective postage metering machine. In this case, the previously described roles of the security module and the data center are simply interchanged and the security module contains the transaction memory, the transaction status information memory and the status model memory. The security module also carries out the required operations during the synchronization and the selection of the recovery strategy.

Figure 2:
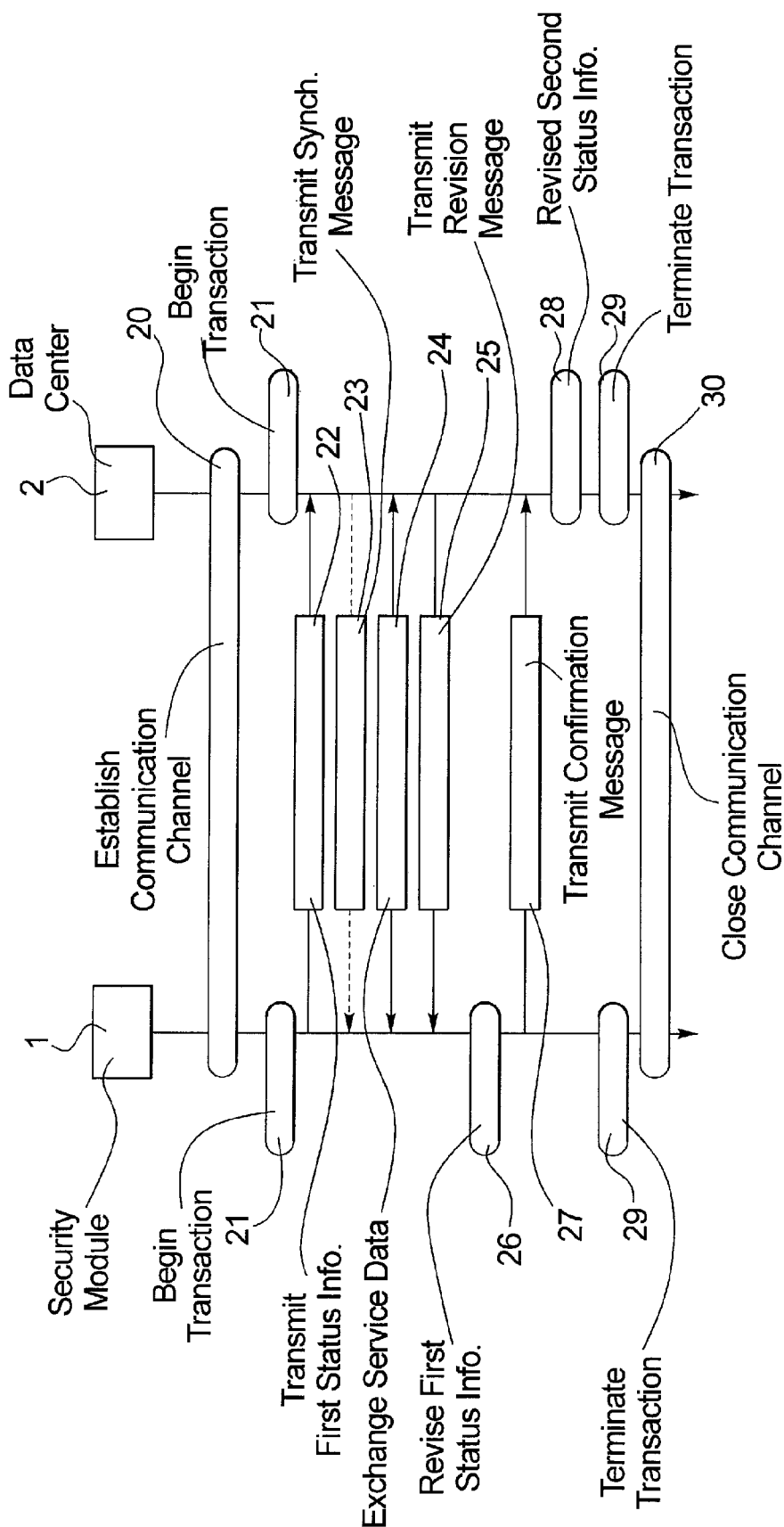
FIG. 2 is a schematic representation of the communication between the first and the second data processing unit in the arrangement according to FIG. 1, namely during a status-changing transaction.

FIG. 2 shows a schematic representation of the communication between the security module 1 and the data center 2 according to FIG. 1 during a status-changing transaction.

In FIG. 2, a secure communication channel is initially established between the security module 1 and the data center 2 in a preliminary step 20. The secure communication channel can be established in any conventional fashion. In the described example, this is realized in the form of a significant mutual authentication between the security module 1 and the data center 2, namely by utilizing the so-called Secure Socket Layer Protocol (SSL 3.0).

The transaction begins in the security module 1 and in the data center 2 with a first step 21. If applicable, corresponding initialization routines or the like are executed in the respective communication partner.

The first status information is transmitted from the security module 1 to the data center 2 in a second step 22. Subsequently, the data center 2 checks in the previously described fashion whether or not the first and the second status information match. If this is not the case, the synchronization is carried out in the above-described fashion.

If a revision of the first status information is required as part of the synchronization, a corresponding synchronization message is transmitted from the data center 2 to the security module 1 in a third step 23. The security module 1 then carries out the revision of the first status information in response to this synchronization message.

Service data is exchanged between the security module 1 and the data center 2 in a fourth step 24. It would also be conceivable that the security module 1 transmits a request for a status change to the data center 2. For example, it may be requested that a certain amount of postage be loaded into the security module 1.

A revision message is transmitted from the data center 2 to the security module 1 in a fifth step 25. This revision message causes the security module 1 to change its state and consequently to revise the first status information. This revision message may be generated, for example, in the data center 2 in response to the above-described request of the security module 1 and contain an amount of postage to be loaded.

Alternatively or additionally, the revision message may also be generated in the data center 2 without a special request of the security module 1. For example, a corresponding revision message maybe generated if a manipulation of the security module 1 is detected in the data center 2 or another location and the security module should now be locked for further use.

The first status information in the security module 1 is then revised in a sixth step 26 in response to the revision message of the data center 2.

In a seventh step 27, a confirmation message generated by the security module 1 is transmitted to the data center 2 in order to confirm the revision of the first status information.

The second status information is then revised in the data center 2 in an eighth step 28 in response to the confirmation message of the security module 1, namely such that the second status information matches the revised first status information. This means that the transaction is successfully completed and terminated in the security module 1 and in the data center 2 in a ninth step 29 before the secure communication channel is closed in a tenth step 30.

The communication protocol between the security module 1 and the data center 2 is designed such that the next message to the respective communication partner contains a positive confirmation regarding the correct reception of the message previously transmitted by this communication partner. If the received message did contain an error, the communication partner is correspondingly notified in the form of a negative confirmation such that the communication partner is able to repeat the message.

An unsuccessfully completed transaction has taken place if no confirmation message or no error-free confirmation message is received in the data center 2, if applicable, within a predetermined number of attempts after the transmission of the revision message. This transaction is treated in the data center 2 in the above-described fashion, dependent on the type of transaction.

Figure 3:
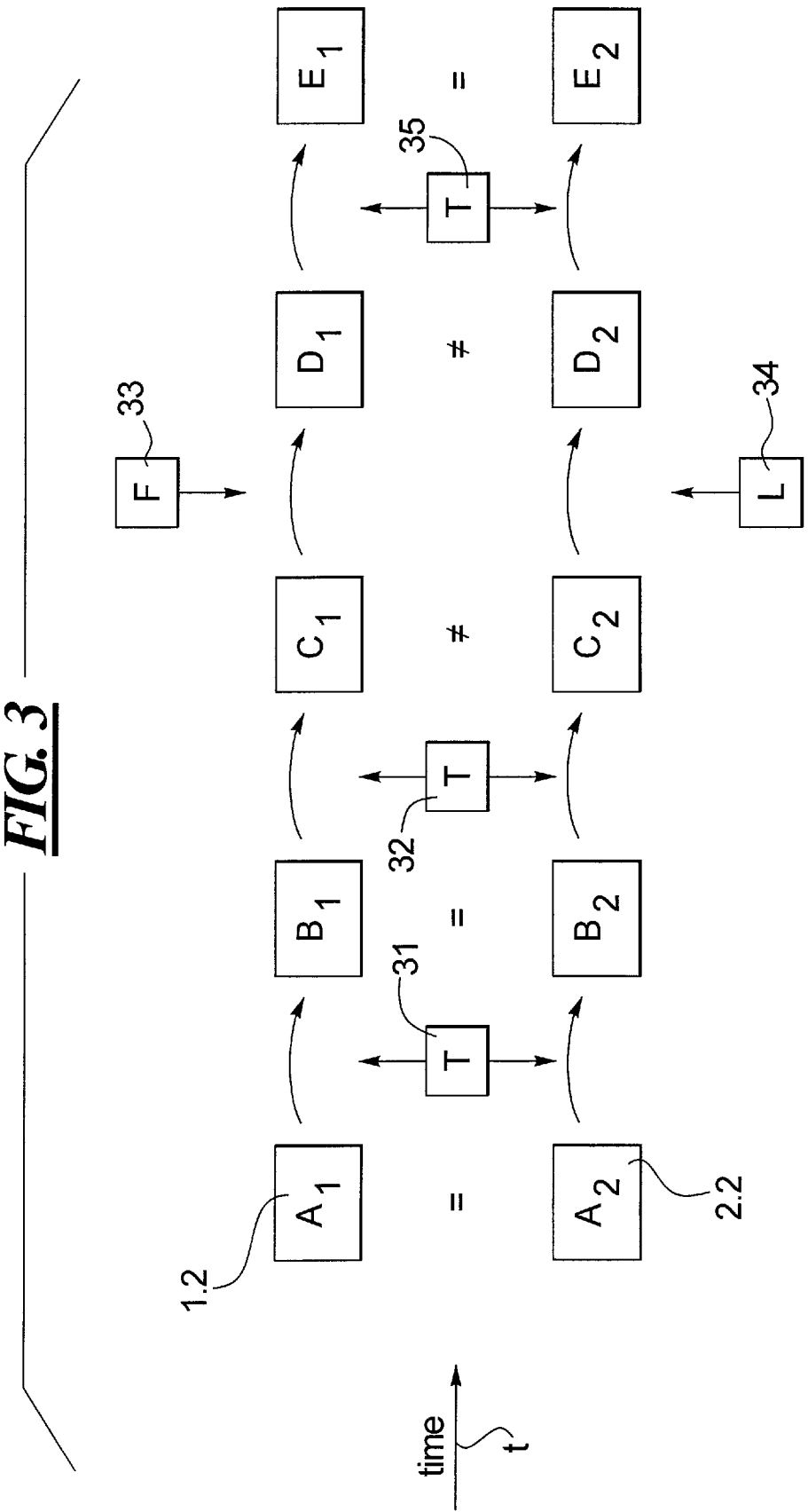
FIG. 3 is a schematic representation of the adaptations of the first and the second status information in the arrangement according to FIG. 1 as a result of a status-changing transaction.

FIG. 3 schematically shows the time history (along a time axis t) of the adaptations of the first and the second status information in the first memory 1.2 and the second memory according to FIG. 1 as a result of a status-changing transaction.

At a first point in time, for example, immediately after the initialization of the postage metering machine 4, the first status information $A_1$ in the first memory 1.2 and the second status information $A_2$ in the second memory 2.2 match ($A_1=A_2$).

A status-changing transaction 31, for example, the clearance of the postage metering machine 4 for use and the depositing of a certain first postage amount, is successfully completed at a second point in time. Immediately after the completion of this transaction 31, the first status information $B_1$ in the first memory 1.2 and the second status information $B_2$ in the second memory 2.2 match ($B_1=B_2$).

Another status-changing transaction 32, for example, the depositing of an additional postage amount, is not successfully completed at a third point in time due to a communication error during the transmission of the revision message by the data center 2. In this case, the first status information remains unchanged while the second status information is revised as if the transaction 32 was successfully completed, namely based on the progressive recovery strategy associated with this transaction. This means that the first status information $C_1$ in the first memory 1.2 and the second status information $C_2$ in the second memory 2.2 no longer match ($C_1 \neq C_2$). In other words, the first and the second status information are in an asynchronous state.

The deviation between the first and the second status information is additionally increased by local status changes 33 in the domain of the postage metering machine 4, for example, the metering F of postage with the postage metering machine 4, and a remotely exerted influence 34. The remotely exerted influence 34 may be, for example, (indicated by locking L) the postage metering machine for further use in case it is detected in the data center 2 or another location that the postage metering machine 4 has been manipulated. This locking L of the postage metering machine is achieved by revising the second status information. The first status information is revised accordingly during the next transaction and leads to the postage metering machine 4 being locked. The first status information $D_1$ in the first memory 1.2 and the second status information $D_2$ in the second memory 2.2 consequently still do not match ($D_1 \neq D_2$) at a fourth point in time. This means that the first and the second status information are still in an asynchronous state.

A transaction 35 is successfully completed at a fifth point in time. During this process, the previously described synchronization of the first and the second status information takes place. This means that the first status information $E_1$ in the first memory 1.2 and the second status information $E_2$ in the second memory 2.2 once again match ($E_1=E_2$), and that the first and the second status information are once again in a synchronous state.

Figure 4:
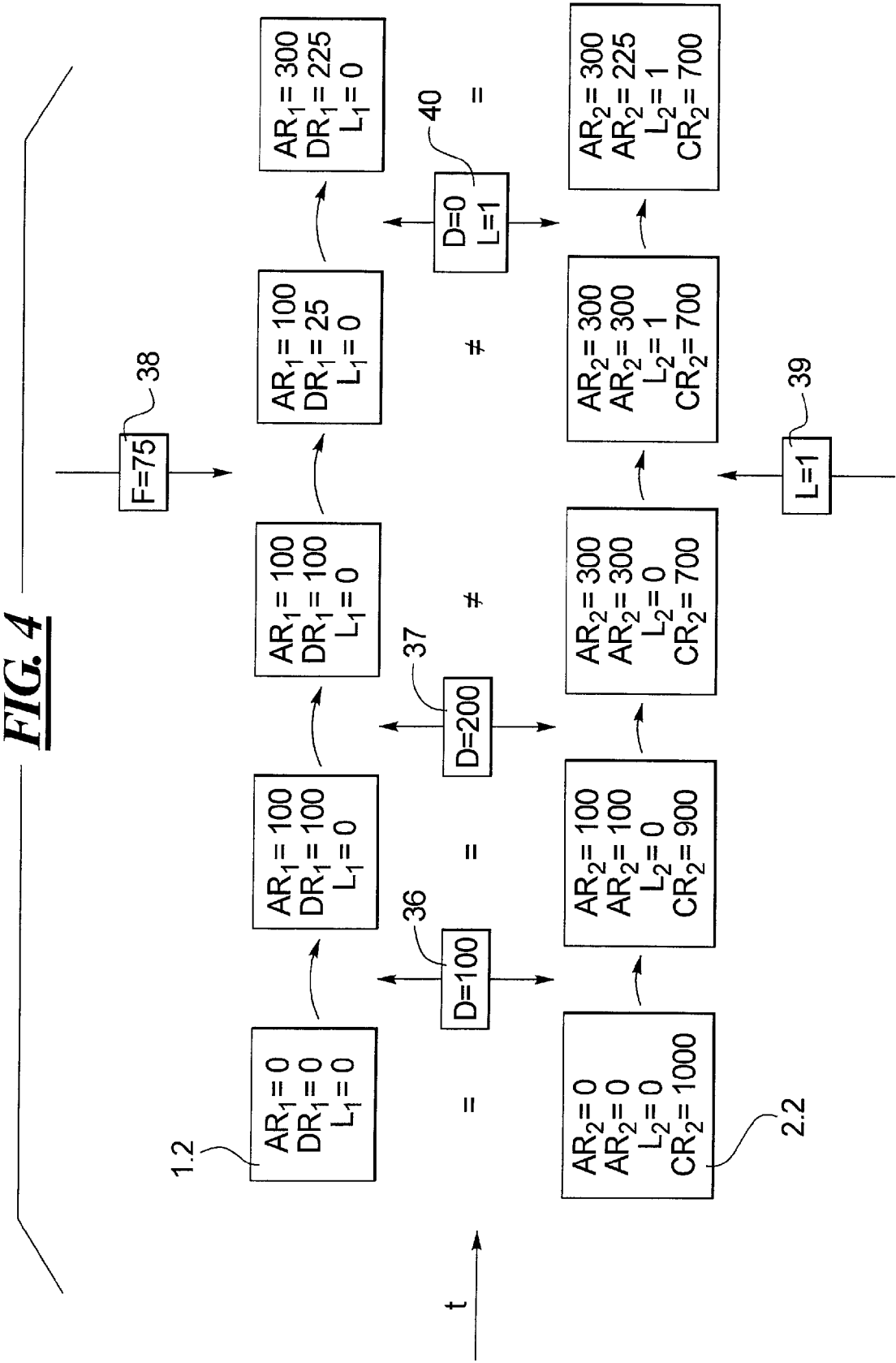
FIG. 4 is a schematic representation of the adaptations of the first and the second status information in the arrangement according to FIG. 1 as a result of a first transaction with progressive recovery strategy.

FIG. 4 shows a concrete numerical example of a schematic time history (along a time axis t) of the revisions of the first and the second status information in the arrangement according to FIG. 1, namely with reference to a first transaction with progressive recovery strategy.

At a first point in time immediately after the initialization and clearance of the postage metering machine 4, the following applies to the first status information $AR_1$ (ascending register 5), $DR_1$ (descending register 6) and $L_1$ (lock-out memory 7) in the first memory 1.2, and to the second status information $AR_2$ (ascending central register 10), $DR_2$ (descending central register 11) as well as $L_1$ (central lock-out memory 12) and $CR_2$ (central credit register 13) in the second memory 2.2:

$$AR_1 = 0 \quad = \quad AR_2 = 0$$
$$DR_1 = 0 \quad = \quad DR_2 = 0$$
$$L_1 = 0 \quad = \quad L_2 = 0$$
$$CR_2 = 1000$$

At a second point in time, a status-changing transaction 36 is successfully completed, namely the depositing of a first postage amount D=100. Immediately after the completion of this transaction 36, the following applies to the first status information in the first memory 1.2 and the second status information in the second memory 2.2.

$$AR_1 = 100 \quad = \quad AR_2 = 100$$
$$DR_1 = 100 \quad = \quad DR_2 = 100$$
$$L_1 = 0 \quad = \quad L_2 = 0$$
$$CR_2 = 900$$

Another status-changing transaction 37 in the form of a deposit of another postage amount D=200 is not successfully completed at a third point in time due to a communication error during the transmission of the revision message by the data center 2. In this case, the first status information remains unchanged and the second status information is revised as if the transaction 37 was successfully completed, namely in accordance with the progressive recovery strategy associated with this transaction. The following now applies to the first and the second status information:

$$AR_1 = 100 \quad \neq \quad AR_2 = 300$$
$$DR_1 = 100 \quad \neq \quad DR_2 = 300$$

-continued
$$L_1 = 0 \quad = \quad L_2 = 0$$
$$CR_2 = 700$$

This means that the first and the second status information are in an asynchronous state.

The deviation between the first and the second status information is additionally increased due to local status changes 38 in the domain of the postage metering machine 4, for example, the use of the postage metering machine 4 for metering postage with a total value F=75. In addition, irregularities are detected when the metering prints produced with the postage metering machine 4 are checked. This means that the postage metering machine 4 should be temporarily locked for further use during the next communication with the data center. For this purpose, the central lock-out memory in the region of the data center 2 is initially set to L=1 by means of a remotely exerted influence 39. This means that the following applies to the first status information in the first memory 1.2 and the second status information in the second memory 2.2 at a fourth time:

$$AR_1 = 100 \quad \neq \quad AR_2 = 300$$
$$DR_1 = 25 \quad \neq \quad DR_2 = 300$$
$$L_1 = 0 \quad \neq \quad L_2 = 1$$
$$CR_2 = 700$$

This indicates that the first and the second status information are still in an asynchronous state.

A transaction 40 for locking the postage metering machine 4 for further use is successfully completed at a fifth point in time. In this case, the above-described synchronization of the first and the second status information initially takes place. For this purpose, the data ($AR_1$, $DR_1$) of the first status information which should be revised during the transaction 37 are set in such a way that they match the data ($AR_2$, $DR_2$) of the second status information which were revised during the transaction 37, namely in accordance with the progressive recovery strategy associated with the prior transaction 37. Subsequently, the lock-out memory $L_1$ is also set during the course of the transaction 40. The first and the second status information are then once again in a synchronous state:

$$AR_1 = 300 \quad = \quad AR_2 = 300$$
$$DR_1 = 225 \quad = \quad DR_2 = 225$$
$$L_1 = 1 \quad = \quad L_2 = 1$$
$$CR_2 = 700$$

Figure 5:
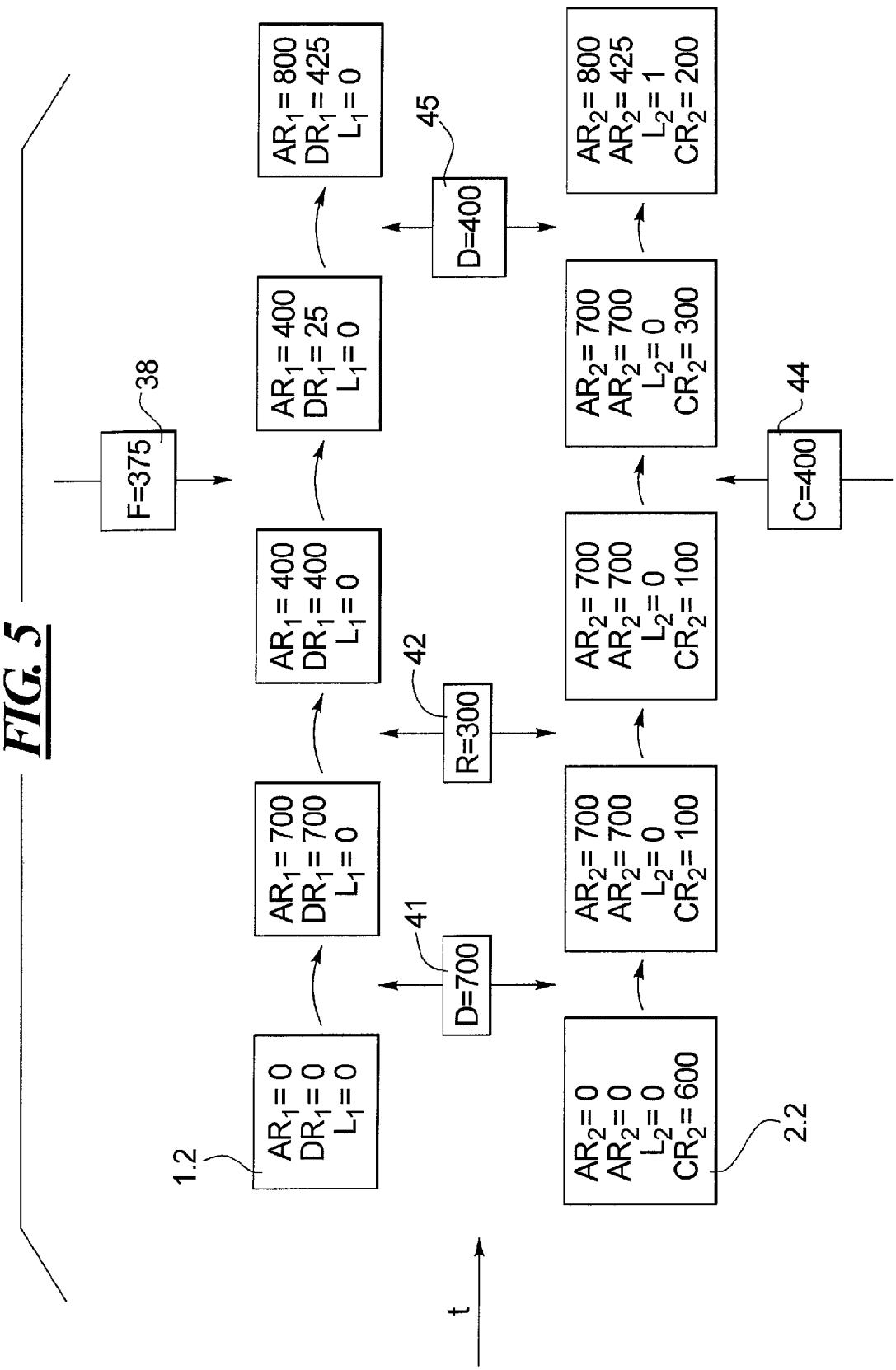
FIG. 5 is a schematic representation of the adaptations of the first and the second status information in the arrangement according to FIG. 1 as a result of a first transaction with defensive recovery strategy.

FIG. 5 shows another concrete numerical example of a schematic time history (along a time axis t) of the revisions of the first and the second status information in the arrangement according to FIG. 1, namely with reference to a first transaction with defensive recovery strategy.

At a first point in time immediately after the initialization and clearance of the postage metering machine 4, the following applies to the first status information $AR_1$ (ascending register 5), $DR_1$ (descending register 6) and $L_1$ (lock-out memory 7) in the first memory 1.2, and to the second status information $AR_2$ (ascending central register 10), $DR_2$ (descending central register 11) as well as L1 [sic] (central lock-out memory 12) and $CR_2$ (central credit register 13) in the second memory 2.2:

$$AR_1 = 0 \quad = \quad AR_2 = 0$$
$$DR_1 = 0 \quad = \quad DR_2 = 0$$
$$L_1 = 0 \quad = \quad L_2 = 0$$
$$CR_2 = 600$$

At a second point in time, a status-changing transaction 41 is successfully completed, wherein an excessively high amount of postage D=700 is erroneously deposited during this first transaction 41. This means that the credit limit of the respective account (see $CR_2$) in the data center is exceeded. Immediately after the completion of this transaction 41, the following applies to the first status information in the first memory 1.2 and the second status information in the second memory 2.2:

$$AR_1 = 700 \quad = \quad AR_2 = 700$$
$$DR_1 = 700 \quad = \quad DR_2 = 700$$
$$L_1 = 0 \quad = \quad L_2 = 0$$
$$CR_2 = -100$$

The user of the postage metering machine 4 now notices the error and initiates another status-changing transaction 42 in order to return the postage amount R=300 to the data center at a third point in time. Due to a communication error during the reception of the confirmation message by the data center 2, the transaction 42 is not successfully completed. In this case, the first status information is revised and the second status information remains unchanged, namely in accordance with the defensive recovery strategy associated with this transaction. The following now applies to the first and the second status information:

$$AR_1 = 400 \quad \neq \quad AR_2 = 700$$
$$DR_1 = 400 \quad \neq \quad DR_2 = 700$$
$$L_1 = 0 \quad = \quad L_2 = 0$$
$$CR_2 = -100$$

This means that the first and the second status information are in an asynchronous state.

The deviation between the first and the second status information is additionally increased due to local status changes 38 in the domain of the postage metering machine 4, for example, the use of the postage metering machine 4 for metering postage with a total value F=375. In addition, a transfer C=400 by the user causes the central credit register 13 in the region of the data center 2 to increase due to an externally exerted influence 44. This means that the following applies to the first status information in the first memory 1.2 and the second status information in the second memory 2.2 at a fourth point in time:

$$AR_1 = 400 \neq AR_2 = 700$$
$$DR_1 = 25 \neq DR_2 = 700$$
$$L_1 = 0 \neq L_2 = 1$$
$$CR_2 = 300$$

This indicates that the first and the second status information are still in an asynchronous state.

A transaction 45 for depositing a postage amount D=400 into the postage metering machine 4 is successfully completed at a fifth point in time. In this case, the above-described synchronization of the first and the second status information initially takes place. For this purpose, the data $(AR_2, DR_2)$ of the second status information which should be revised during the transaction 42 are set in such a way that they match the data $(AR_1, DR_1)$ of the first status information which were revised during the transaction 42, namely in accordance with the defensive recovery strategy associated with the prior transaction 37. Subsequently, the data $(AR_1, AR_2, DR_1, DR_2)$ of the first and the second status information are set in accordance with the amount deposited during the course of the transaction 45. The first and the second status information are then once again in a synchronous state:

$$AR_1 = 800 = AR_2 = 800$$
$$DR_1 = 425 = DR_2 = 425$$
$$L_1 = 1 = L_2 = 1$$
$$CR_2 = 200$$

The present invention was described above with reference to postage metering machines, however, the invention may also be used in connection with any other first data processing devices, the status of which can be changed via a second data processing unit by means of status-changing transactions.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for exchanging data between a first postal data processing unit of a postage metering system containing first status information about said first postal data processing unit and a second postal data processing unit of a remote postal data center containing second status information about said first postal data processing unit, comprising the steps of:

exchanging postal-related data between said first postal data processing unit and said second postal data processing unit during transactions, said transactions including a first status-changing transaction which can be of two different types, and a second status-changing transaction following said first status-changing transaction, wherein said first or second postal data processing unit comprises a processor and a memory;

only upon a successful completion of an entirety of said first status-changing transaction, revising said first status information and said second status information such that they match by revising said first status information by triggering a revision message in said second postal data processing unit and transmitting said revision message to said first postal data processing unit, and revising said second status information by triggering a confirmation message in said first data processing unit and transmitting said configuration message to said second data processing unit, said confirmation message confirming said revision of said first status information;

only upon an unsuccessful completion of said entirety of said first status-changing transaction, setting said first status information and said second status information dependent on the type of said first status changing transaction, if said first status-changing transaction is not successfully completed due to a failure of a flawless confirmation message to be received at said postal second data processing unit;

comparing said first status information and said second status information during said second status-changing transaction; and if an inconsistency exists, synchronizing said first status information and said second status information dependent on the type of said first status-changing transaction to reestablish conformity between said first status information and said second status information; and making a defensive recovery strategy and a progressive recovery strategy available to said first and second data processing units for reestablishing conformity between said first status information and said second status information after the unsuccessful completion of said first status-changing transaction, and selecting said recovery strategy dependent on the type of said first status-changing transaction;

if said synchronization is initiated by said first postal data processing unit, setting said first status information in an unchanged fashion when employing said defensive recovery strategy and setting said first status information as if said first status-changing transaction were successfully completed when employing said progressive recovery strategy; and if said synchronization is initiated by said second postal data processing unit, setting said second status information in an unchanged fashion when employing said defensive recovery strategy and setting said second status information as if said first status-changing transaction were successfully completed when employing said progressive recovery strategy.

2. A method according to claim 1, comprising generating and storing a transaction status information, dependent on the type of said first status-changing transaction, in one of said first postal data processing unit or said second postal data processing unit if said first status-changing transaction is not successfully completed.

3. A method according to claim 2, comprising setting at least one of said first status information or said second status information dependent on said transaction status information.

4. A method according to claim 3, comprising storing said transaction status information in said second postal data processing unit and setting at least said second status information dependent on said transaction status information.

5. A method according to claim 1, comprising generating and storing a first transaction status information that depends on the type of said first status-changing transaction if said first status-changing transaction is not successfully completed, and synchronizing said first status information and said second status information dependent on the type of said first status-changing transaction.

6. A method according to claim 5, comprising storing said first transaction status information in said second postal data processing unit and initiating said synchronization with said second postal data processing unit.

7. A method according to claim 1 comprising:
storing a status model that covers all possible revisions of said first status information about said first postal data processing unit;
conducting an integrity check for determining whether achieving conformity between said first status information and said second status information is possible during said synchronization;
continuing the synchronization if it is determined that achieving conformity between said first status information and said second status information is possible; and
interrupting the synchronization if it is determined that achieving conformity between said first status information and said second status information is not possible.

8. A method according to claim 1 comprising employing a data center located remotely from said first postal data processing unit as said second postal data processing unit.

9. A method according to claim 1 comprising employing a security module of said postage metering system as said first data processing unit.

10. A postage metering system comprising:
a first postal data processing unit and a second postal data processing unit that can communicate with one another via a communication link;
said first postal data processing unit having a plurality operating states and comprising a first memory for storing first status information defining an operating state of said first postal data processing unit;
said second postal data processing unit comprising a second memory for storing second status information representing the operating state of said first postal data processing unit;
said first postal data processing unit and said second postal data processing unit being configured to conduct transactions by exchanging postal-related data between said first postal data processing unit and said second postal data processing unit via said communications link, said transactions including a first status-changing transaction that can be of two different types, and a second status-changing transaction following said first status-changing transaction;
said first postal data processing unit and said second postal data processing unit being configured to revise said first status information and said second status information such that they match only if an entirety of said status-changing transaction is net successfully completed;
said first postal data processing unit being configured to revise said first status information in response to a revision message received from said second postal data processing unit during said status-changing transaction;
said second postal data processing unit being configured to revise said second status information in response to a confirmation message received from said first data processing unit which confirms the revision of said first status information;
said second postal data processing unit being configured to set said second status information dependent on the type of said first status-changing transaction if said status-changing transaction is not successfully completed due to a failure of a flawless confirmation message to be received by said second postal data processing unit;
said first postal data processing unit being configured to operate in one of a defensive recovery mode and a progressive recovery mode to reestablish conformity between said first status information and said second status information after an unsuccessful completion of said status-changing transaction; and to select said recovery mode dependent on the type of said status-changing transaction, by setting said first status information in an unchanged fashion in said defensive recovery mode, and by setting said first status information as if said first transaction were successfully completed in said progressive recovery mode;
said second postal data processing unit also being configured to operate in one of a defensive recovery mode and a progressive recovery mode to reestablish conformity between said first status information and said second status information after an unsuccessful completion of said status-changing transaction, and to select said recovery mode dependent on the type of first transaction by setting said second status information in an unchanged fashion in said defensive recovery mode, and by setting said second status information as if said first transaction was successfully completed in said progressive recovery mode;
said first postal data processing unit and said second postal data processing unit being configured to reestablish conformity between said first status information and said second status information by a synchronization if an inconsistency exists between said first and second status information; and
said first postal data processing unit and said second postal data processing unit being configured to conduct said synchronization of said first status information and said second status information dependent on the type of said first status-changing transaction.

11. A system according to claim 10, wherein one of said first postal data processing unit or said second postal data processing unit is configured to generate and to store transaction status information dependent on the type of said status-changing transaction if said status-changing transaction is not successfully completed.

12. A system according to claim 11, wherein said first postal data processing unit is configured to store said transaction status information to set said first status information dependent on said transaction status information.

13. A system according to claim 11, wherein said second postal data processing unit is configured to store said first transaction status information and to set said second status information dependent on said transaction status information.

14. A system according to claim 10, wherein said second postal data processing unit is configured to generate and to store first transaction status information if said first status-changing transaction is not successfully completed, said first transaction status information depending on the type of said first status-changing transaction, and wherein said second postal data processing unit is configured to select said recovery mode dependent on said type of said first transaction status information.

15. A system according to claim 14, comprising:
a status model memory accessible by at least one of said first postal data processing unit and said second postal data processing unit, containing a status model covering all possible revisions of said first status information about said first postal data processing unit;
at least one of said first postal data processing unit and said second postal data processing unit being configured to conduct an integrity check during said synchronization to determine whether conformity between said first status information and said second status information is possible to achieve based on said status model; and said at least one of said first postal data processing unit and said second postal data processing unit being configured to conduct said synchronization if it is determined that conformity between said first status information and said second status information is possible to achieve and to interrupt said synchronization if it is determined that conformity between said first status information and said second status information is not possible to achieve.

16. A system according to claim 10, wherein:

said first postal data processing unit comprises a first processor, a memory containing said first status information connected to said first processor, and a first communication device connected to said first processor, said processor being configured to revise and set said first status information in said first memory; and said second postal data processing unit comprises a second processor, a memory containing said second status information connected to said second processor, and a second communication device connected to said second processor for exchanging data with said first communication device in said first data processing unit, said second processor being configured to revise and set said second status information in said second memory.

17. A system according to claim 10, wherein said second postal data processing unit is a data center located remotely from said first postal data processing unit.

18. A system according to claim 10, wherein said first postal data processing unit is a security module of a postage metering machine.

* * * * *